Figure 1:
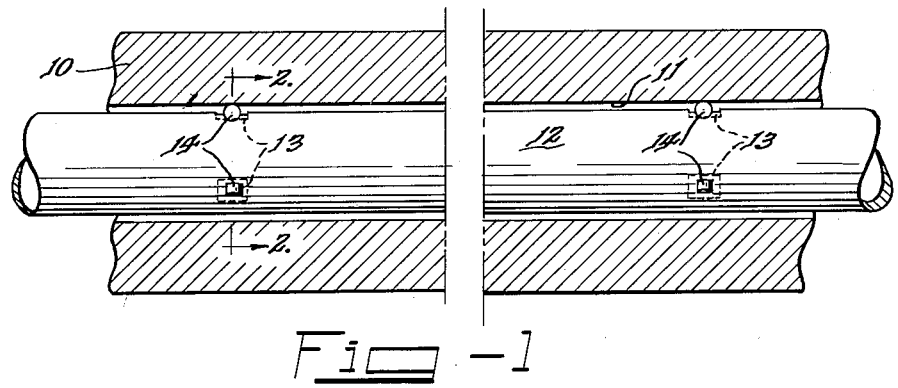

July 11, 1961 G. E. LONGHURST 2,992,048
TOOL ASSEMBLY WITH BI-DIRECTIONAL BEARING
Filed Aug. 5, 1960 2 Sheets-Sheet 1

INVENTOR.
George E. Longhurst
BY
Attorney

July 11, 1961        G. E. LONGHURST        2,992,048
TOOL ASSEMBLY WITH BI-DIRECTIONAL BEARING
Filed Aug. 5, 1960        2 Sheets-Sheet 2
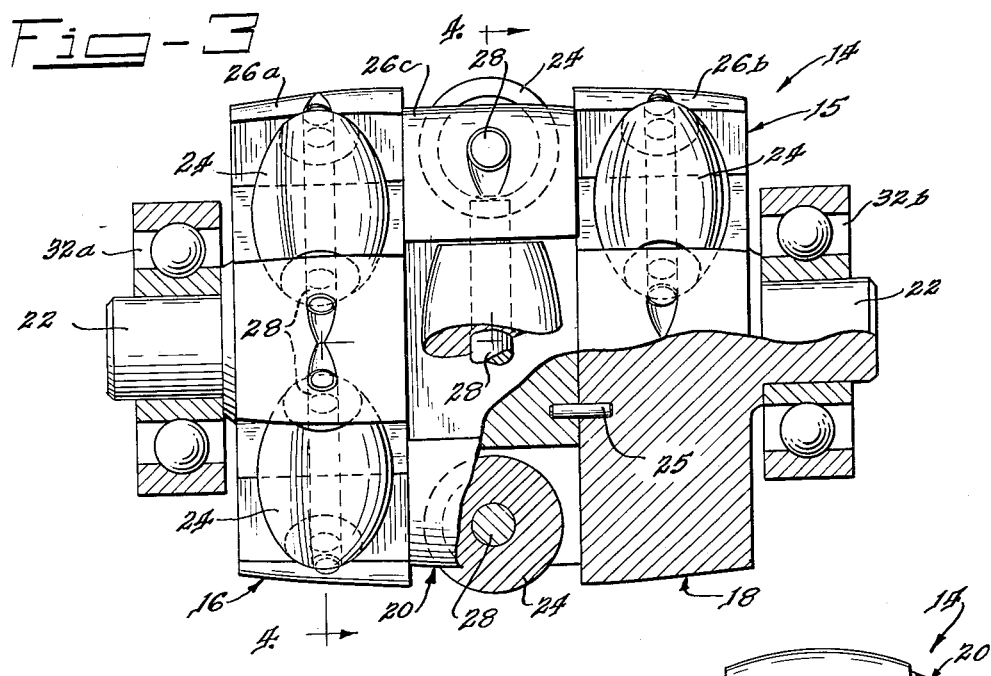
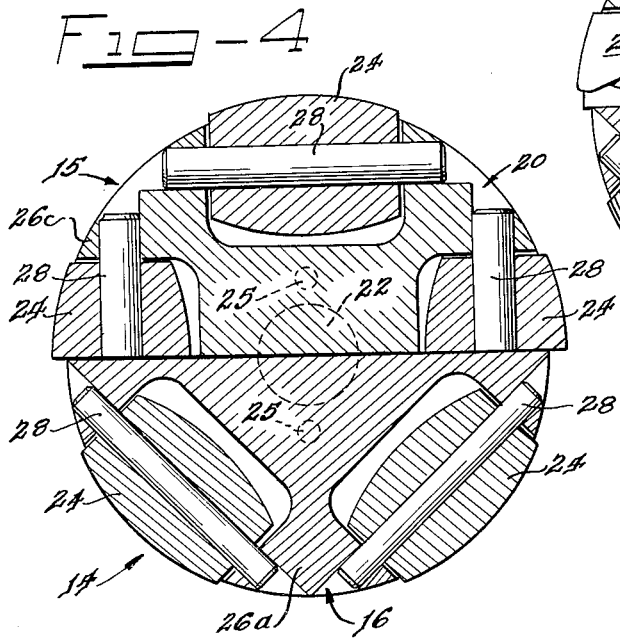
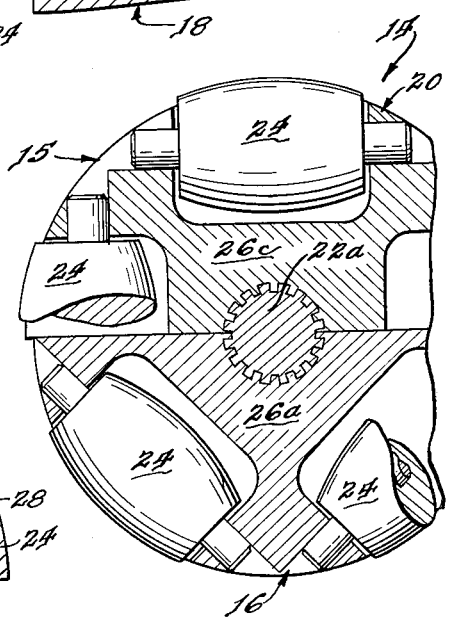
INVENTOR.
George E. Longhurst
BY
Roland G. Anderson
Attorney

United States Patent Office 2,992,048
Patented July 11, 1961

2,992,048
TOOL ASSEMBLY WITH BI-DIRECTIONAL BEARING
George E. Longhurst, Watervliet, N.Y., assignor to the United States of America as represented by the United States Atomic Energy Commission
Filed Aug. 5, 1960, Ser. No. 47,884
2 Claims. (Cl. 308—6)

This invention relates to a tool assembly and more specifically to a cylindrical tool assembly having a bearing connected thereto so as to permit axial and rotational movement of the tool assembly within a bore.

The movement of a large, heavy cylinder, such as a cylindrical tool assembly, within a close fitting bore requires that a suitable bearing be provided. Unusual problems in providing a suitable bearing for such a cylinder are presented when the cylinder must be moved both axially and rotationally within a bore, particularly if the bore contains restrictions so that the bearings cannot be attached to the side of the bore but must be attached to the circumference of the cylinder. While ball bearings would provide for bi-directional movement, the point contact limits the load which can be carried. On the other hand, conventional roller bearings are able to bear greater loads but only provide for mono-directional movement.

It is an object of the present invention to provide a cylindrical tool assembly having bi-directional bearing for the longitudinal and rotational motion of the tool assembly within a bore.

It is a further object of the present invention to provide a bearing capable of providing a bi-directional bearing surface for a cylinder within a bore.

These and other objects will be apparent from the following description and drawings showing the apparatus and in which like reference characters denote like parts throughout the several views. It is to be understood, however, that the specific embodiment is shown by way of illustration only, to make the principles and practice of the invention more readily comprehensible, and without any intent of limiting the invention to the specific details therein shown.

Figures 2, 2B:
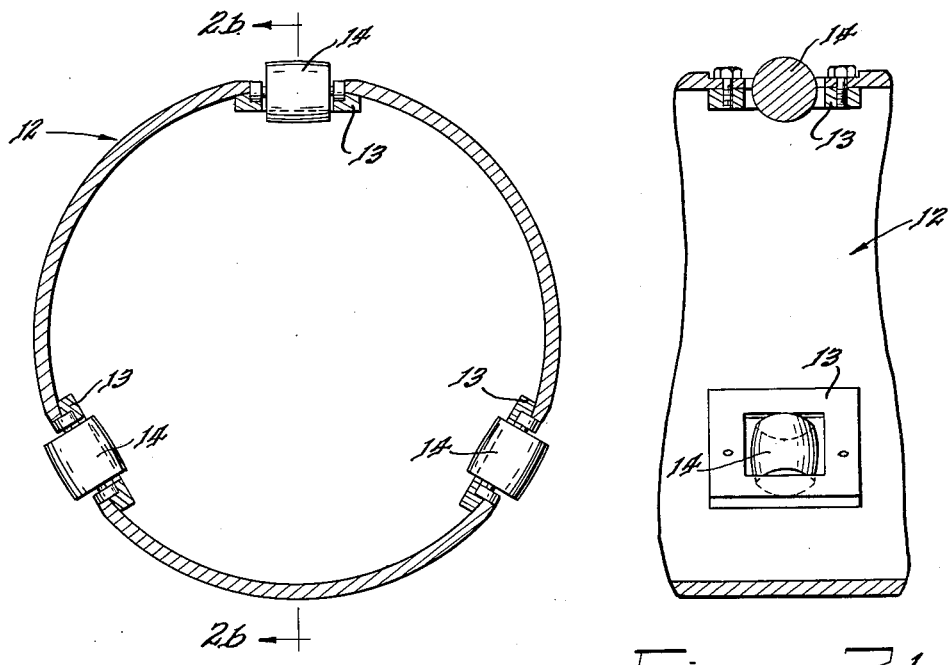

In the drawings:

FIG. 1 is a horizontal plan sectional view of a portion of a wall having a bore containing the tool assembly showing a plurality of bi-directional bearings, and FIG. 2 is a vertical elevational sectional view taken on line 2—2 of FIG. 1 showing three bi-directional bearings arranged about the tool assembly, and FIG. 2b is a sectional view taken on the line 2b—2b of FIG. 2 showing the tool assembly with its bi-directional bearings mounted in a rectangular frame, and FIG. 3 is an elevational view partly in section of the bi-directional bearing used in the tool assembly, and FIG. 4 is a transverse sectional view taken on the line 4—4 of FIG. 3, and FIG. 5 is a transverse sectional view similar to FIG. 4, showing another embodiment of the invention.

Briefly, the invention comprises a cylindrical tool assembly adaptable to axial and rotational movement within a bore. A plurality of bi-directional bearing assemblies are fixed equidistantly about the circumference of the cylindrical tool assembly to provide the tool assembly with a bearing surface for axial and rotational motion. The bi-directional bearing assembly comprises a bearing housing and a central shaft assembly connected to the bearing assembly. Bearing means are provided for rotatably connecting the central shaft assembly to the tool assembly. The central shaft assembly is mounted chordally with respect to the axis of the tool assembly so that the bearing housing which rotates with the central shaft assembly provides for longitudinal motion of the tool assembly. The bearing housing is provided with a plurality of rollers, each of which is mounted on a roller shaft with the axis of the shaft chordal with respect to the circumference of the housing and a surface of each roller projecting above the housing to provide a bearing surface for rotational movement of the tool assembly within the bore. The term "bearing surface" is used throughout the application to define the surface portion of the roller that contacts the bore surface. The bi-directional bearing assembly thus provides for longitudinal movement of the tool by the bearing housing rotating with the central shaft assembly and provides for rotational movement of the tool assembly by the rotation of the individual rollers about their shafts.

Referring more specifically to FIGS. 1, 2, and 2b, a wall 10 has a bore 11. The bore 11 of wall 10 provides the surface for the axial and rotational movement therein of a tool assembly 12 having bi-directional bearing assemblies 14 capable of supporting longitudinal and rotational motion of the tool assembly 12. The bi-directional bearing assemblies 14 are fixed in groups of three equidistantly from each other about the circumference of the tool assembly 12. The bearing assemblies are each mounted in a rectangular frame 13 which is secured to the tool assembly 12.

Referring now more particularly to FIGS. 3 and 4, each of the bi-directional bearing assemblies 14 comprises a bearing housing 15 having a first roller section 16, a second roller section 18, and an intermediate roller section 20. The number of roller sections can be varied from two to as many as desired. Mounted at each end of the bearing assembly 14 is a stub bearing shaft 22. A central bearing shaft can be used in place of the pair of stub bearing shafts 22. The stub bearing shafts 22 are mounted chordally with respect to the circumference of the tool assembly 12 and the housing 15 and the stub bearing shafts 22 rotate about the central axis of the shafts 22 which are connected to two conventional central bearings 32a and 32b. Roller sections 16, 18, and 20 each contain four circumferentially bulged cylindrical rollers 24 spaced equidistant from each other about the circumference or perimeter of the roller sections. The intermediate roller section 20 is rotated 45° about the axis of the bearing assembly 14 with respect to the first and second roller sections and is connected to said first and second roller sections by pins 25.

FIG. 5 illustrates another embodiment wherein a splined central bearing shaft is used to connect the first and second sections with the intermediate sections. Therefore, in this case, the bearing housing 15 rotates with the splined shaft 22a which is rotatably connected to two conventional central bearings 32a and 32b. The bearings 32a and 32b are fixed in their chordal position on the tool assembly when the bearing assembly 14 is mounted for use.

Referring to FIG. 3 of the drawings, the rollers 24 are positioned so that the bearing surface for all rollers is at all times equidistant from the center of the cylindrical tool assembly. This arrangement permits contact between the rollers 24 and the bore 11 to be maintained at all times, either by contact with one roller 24 of the intermediate roller section or two rollers 24, one from each of the first and second roller sections. Each roller 24 is fixed into one of the housing sections 26a, 26b, and 26c, which are part of each of the roller sections 16, 18, and 20, respectively, by a roller shaft 28. The bearing surface of each of the rollers 24 projects slightly above its corresponding housing section 26a, 26b, or 26c. The rollers 24 are mounted chordally in the circumference of each housing section 26a, 26b, and 26c.

Referring to FIGS. 3 and 4 of the drawings, the curvature of the bearing surface of the rollers for each of the roller sections defines circles having radii equal to the distance from the axis of the bearing assembly, taken at the center point of each circle, to the bore surface. A central bearing 32a and a central bearing 32b, which can be either conventional ball or roller bearing, is provided adjacent to the first roller section 16 and to the second roller section 18, respectively. The housing sections 26a and 26b are connected with housing sections 26c so that the bearing housing sections 26a, 26b, and 26c will be permitted to rotate with the central bearing shafts 22. The outer portion containing the outer race of central bearings 32a and 32b is fixed to the rectangular frame 13 so that the housing 15 and the shafts 22 can rotate with the inner portion containing the inner race of central bearings 32a and 32b. The central bearing shafts 22 are located on the longitudinal axis of the bearing assembly 14. The housing sections 26a, 26b, and 26c, together with the roller sections 16, 18, and 20, form the bearing housing 15 which is shaped like a circumferentially bulged cylinder with the rollers 24 of the intermediate section 20, being further from the axis of the central shaft members 22 than the rollers 24 of the first and second roller sections.

The operation of the longitudinal and rotational bearing is as follows:

When the tool assembly 12 is inserted within the bore 11 of the wall 10, longitudinal motion for the tool assembly 12 is provided by the rotation of the circumferentially bulged bearing housings 15 which are caused to rotate as a conventional roller by the two conventional central bearings 32a and 32b which are mounted on the central bearing shafts 22. The cylindrical housing sections 26a, 26b, and 26c with their circumferentially bulged cylindrical rollers 24 provide the circumferentially bulged roller shape configuration of bearing housing 15 which rotates with the central bearing shafts 22.

Rotation of the tool assembly 12 within the bore 11 is provided by the rollers 24 which project slightly above the housing sections 26a, 26b, and 26c and contact the bore 11. The rollers 24 rotate about their respective shafts 28 and the arrangement of the rollers 24 in each of their respective roller sections permits either one roller 24 from the intermediate roller section 20 or two rollers 24, one from each of the first and second roller sections, to provide rotational bearing for the tool assembly 12, depending on the rotational position of the bearing housing 15 on the circumference of the tool assembly 12.

The cylindrical tool assembly 12, as shown in the drawings, is a long iron cylinder approximately 21 to 28 feet long, having a diameter of 16 inches and a weight of about 8 tons, if completely solid or if it contains an inner lead core. The diameter of the bore 11 is approximately equal to the diameter of the arc formed by the bearing surfaces of the three bi-directional bearing assemblies 14 located about the circumference of the tool assembly 12. The bearing assembly 14 is used to satisfy the longitudinal and rotational requirements of a shaft within a bore.

A variation of the subject invention can be made by using a straight cylinder instead of a circumferentially bulged cylinder as above described. This variation would permit the bearing assembly to roll on a flat surface.

It will be readily apparent that many modifications and variations of this invention may be made by anyone skilled in the art, in accordance with the principles of the invention hereinabove set forth and without the use of any inventive ingenuity. Therefore, without limitation in this respect, the invention is defined by the following claims.

I claim:

1. A tool assembly adaptable to bi-directional movement within a bore, comprising in combination, a tool having at least one bi-directional bearing assembly mounted on the outer perimeter of the tool, said bi-directional bearing assembly having a bearing surface projecting above the surface of the tool, said bearing assembly comprising a housing; a central shaft assembly connected to said housing for rotation therewith; and bearing means rotatably connecting said central shaft assembly to said tool assembly so as to provide for longitudinal motion of said tool, said housing being provided with a plurality of rollers, each roller rotatably mounted on a roller shaft connected to the housing for providing rotational movement of the tool assembly within the bore.

2. A cylindrical tool assembly, adaptable to axial and rotational movement within a bore, comprising in combination a cylindrical tool having a plurality of bi-directional bearing assemblies mounted on the circumference of said tool and having a bearing surface projecting above the surface of said cylindrical tool, each of said bearings comprising a central shaft assembly mounted chordally with the circumference of the tool, a circumferentially bulged cylindrical housing connected to said central shaft assembly; said housing having a plurality of roller sections; each of said sections having a plurality of circumferentially bulged cylindrical rollers, the bearing surface of said rollers projecting slightly above said housing, each roller rotatably mounted chordally in the circumference of said housing on a roller shaft, the bearing surface of each of said rollers being so curved that the bearing surface arc formed by all said rollers during axial and rotational motion of said tool has all points on the arc equidistant from the center line of said cylindrical tool; and bearing means rotatably connecting said central shaft assembly to said tool assembly so as to provide for longituidinal motion of said tool assembly.

References Cited in the file of this patent

UNITED STATES PATENTS

| | | |
|---|---|---|
| 867,511 | Karns | Oct. 1, 1907 |
| 1,123,851 | Cooper | Jan. 5, 1915 |
| 1,913,365 | Baily | June 13, 1933 |
| 2,903,307 | Peters et al. | Sept. 8, 1959 |